(12) United States Patent
Miura

(10) Patent No.: US 9,470,332 B2
(45) Date of Patent: Oct. 18, 2016

(54) SOLENOID VALVE

(71) Applicant: DENSO CORPORATION, Kariya, Aichi-pref. (JP)

(72) Inventor: Yuichiro Miura, Obu (JP)

(73) Assignee: DENSO CORPORATION, Kariya (JP)

( * ) Notice: Subject to any disclaimer, the term of this patent is extended or adjusted under 35 U.S.C. 154(b) by 281 days.

(21) Appl. No.: 14/288,469

(22) Filed: May 28, 2014

(65) Prior Publication Data

US 2014/0367595 A1 Dec. 18, 2014

(30) Foreign Application Priority Data

Jun. 18, 2013 (JP) .................................. 2013-127468

(51) Int. Cl.
*F16K 31/02* (2006.01)
*F16K 31/06* (2006.01)
*F02M 25/08* (2006.01)

(52) U.S. Cl.
CPC ........ *F16K 31/0696* (2013.01); *F02M 25/089* (2013.01); *F16K 31/0655* (2013.01); *F16K 31/0689* (2013.01)

(58) Field of Classification Search
CPC ........... F16K 31/0696; F16K 31/0655; F16K 31/0689; F02M 25/089
USPC ......... 251/129.15, 129.19, 64, 129.2, 129.18
See application file for complete search history.

(56) References Cited

U.S. PATENT DOCUMENTS

| | | | | |
|---|---|---|---|---|
| 3,633,869 | A | * | 1/1972 | Lehmann ............ F16K 31/0689 251/129.18 |
| 6,254,200 | B1 | * | 7/2001 | Ganzel .................... B60T 8/363 303/113.1 |
| 7,270,310 | B2 | * | 9/2007 | Takakura ................ F16K 24/04 251/30.04 |
| 2006/0117553 | A1 | | 6/2006 | Tsuge et al. |

FOREIGN PATENT DOCUMENTS

| | | |
|---|---|---|
| JP | S55-161970 U | 11/1980 |
| JP | 2000-130630 A | 5/2000 |
| JP | 2004-116616 A | 4/2004 |
| JP | 2005-098340 A | 4/2005 |
| JP | 2006-153231 A | 6/2006 |
| JP | 4019360 B2 | 12/2007 |

* cited by examiner

*Primary Examiner* — Craig Schneider
*Assistant Examiner* — Andrew J Rost

(57) ABSTRACT

A stator is located in a coil. A movable body is attracted toward the stator when the stator is magnetized by the coil. A valve element is movable integrally with the movable body to open and close a fluid passage when the coil is activated and de-activated. A regulating member is opposed to the movable body to regulate movement of the movable body. An elastic member is equipped to one of the regulating member and the movable body and is elastically deformable between the movable body and the regulating member when the movable body is attracted toward the stator. The elastic member is located at a position shifted in a radial direction relative to the regulating member or the movable body. The elastic member is in an asymmetrical shape relative to an axial rotational direction.

5 Claims, 8 Drawing Sheets

SOLENOID VALVE

CROSS REFERENCE TO RELATED APPLICATION

This application is based on reference Japanese Patent Application No. 2013-127468 filed on Jun. 18, 2013, the disclosure of which is incorporated herein by reference.

TECHNICAL FIELD

The present disclosure relates to a solenoid valve including a movable body integrally equipped with a valve element and movable in an axial direction to open and close a fluid passage.

BACKGROUND

FIG. 16A shows an example disclosed in Patent Document 1. In FIG. 16A, a movable body 100 is opposed to a stator 110. The stator 110 has an end surface equipped with a projection 120. The projection 120 is formed of rubber. When the stator 110 is magnetized, the movable body 100 is attracted by the stator 110. Thus, the movable body 100 moves in a direction shown by an arrow. Consequently, in the state shown in FIG. 16B, the projection 120 is urged onto an end surface of the movable body 100 and is elastically deformed in the axial direction. In this way, the projection 120 absorbs kinetic energy of the movable body 100.

Patent Document 1

Publication of Japanese patent No. 4019360

In the configuration of Patent Document 1, the movable body 100 and the projection 120 may cause a large collision sound, and fluid flow controlled by the movable body 100 and the projection 120 may become unstable, when the movable body 100 collides against the projection 120.

SUMMARY

It is an object of the present disclosure to produce a solenoid valve including a movable body and an elastic member, the solenoid vale configured to reduce collision sound and/or to reduce fluctuation in flow when the movable body collides against the elastic member.

Referring to FIG. 16A, the movable body 100 moves toward the stator 110 on electricity supply. As shown in FIG. 16B, the projection 120 collides against the movable body 100. Thus, the projection 120 is urged onto an end surface of the movable body 100 and is elastically deformed in the axial direction.

The inventor conceived a concern in the configuration shown in FIGS. 16A and 16B. The movable body 100 is attracted by the stator 110 to move toward the stator 110. Thus, the projection 120, which is formed of rubber, is urged onto the end surface of the movable body 100 to deform elastically in an axial direction by a flexure Ya. In the present state, the flexure Ya may primarily absorb kinetic energy of the movable body 100 moving toward the stator 110. Therefore, in a case where the movable body 100 has large kinetic energy, the projection 120 may not absorb the kinetic energy sufficiently. Consequently, as shown in FIG. 16C, the movable body 100 may bounce on the end surface by a large amount of bounce Xa. As a result, the movable body 100 and the projection 120 may cause a large collision sound, and fluid flow controlled by the movable body 100 and the projection 120 may become unstable, when the movable body 100 collides against the projection 120.

According to an aspect of the present disclosure, a solenoid valve comprises a coil configured to function as an electromagnet when supplied with electricity and activated. The solenoid valve further comprises a stator located radially inside the coil and configured to be magnetized with the electromagnet. The solenoid valve further comprises a movable body configured to be attracted by the stator to move toward the stator in a movable direction when the stator is magnetized with the electromagnet. The solenoid valve further comprises a valve element movable integrally with the movable body in an axial direction. The solenoid valve further comprises a regulating member opposed to the movable body in the movable direction and configured to regulate movement of the movable body. The solenoid valve further comprises at least one elastic member equipped to one of the regulating member and the movable body. The at least one elastic member is configured to be urged between the movable body and the regulating member and to deform elastically to absorb a kinetic energy of the movable body when the movable body is attracted by the stator to move toward the stator. The electromagnet is configured to move the valve element integrally with the movable body in the axial direction to open and close a fluid passage when activated and de-activated. The at least one elastic member is located at a position shifted in a radial direction relative to the one of the regulating member and the movable body. The at least one elastic member is in an asymmetrical shape relative to an axial rotational direction.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, embodiments according to the present disclosure will be described in detail.

First Embodiment

Figure 6:
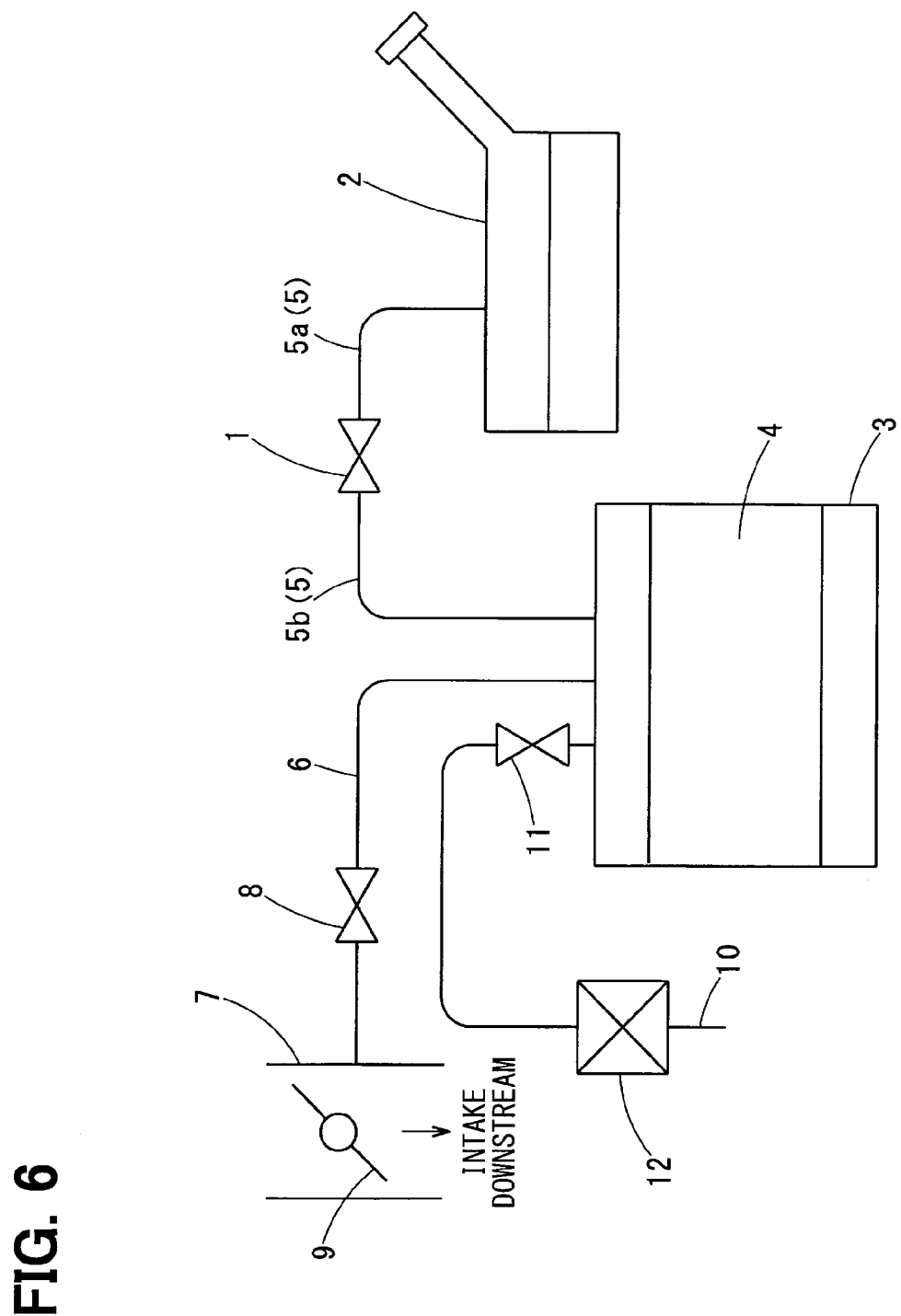
FIG. 6 is an overview showing a vapor fuel processing system according to the first embodiment.

In the first embodiment, a solenoid valve 1 of the present disclosure is employed in a vapor fuel processing system of a vehicle. The vehicle is equipped with an internal combustion engine. As shown in FIG. 6, the vapor fuel processing system includes a canister 3, which is configured temporarily to absorb and hold vapor fuel evaporated in a fuel tank 2. The canister 3 has an interior charged with an adsorbent 4, such as activated carbon, to adsorb vapor fuel. The fuel tank 2 and the canister 3 are connected with each other through a pipe 5 (5a, 5b). The solenoid valve 1 is equipped to an intermediate portion of the pipe 5. Vapor fuel first flows into the interior of the canister 3. The vapor fuel is drawn by negative pressure generated by intake air, which is drawn into the internal combustion engine (not shown) when the internal combustion engine is in operation. The vapor fuel passes from the canister 3 through the pipe 6 into an interior of an intake pipe 7. The vapor fuel is further drawn into a combustion chamber of the internal combustion engine and burned in the combustion chamber.

A pipe 6 connects the canister 3 with the intake pipe 7. The pipe 6 is equipped with a purge control valve 8, which controls flow of the vapor fuel drawn into the interior of the intake pipe 7. The pipe 6 is connected to the intake pipe 7 at a downstream side of a throttle valve 9 relative to a flow direction of intake air. The throttle valve 9 is equipped inside the intake pipe 7. The canister 3 is connected with an atmospheric pipe 10, which opens to the atmosphere. The atmospheric pipe 10 is equipped with a canister control valve 11 and a filter 12. The canister control valve 11 is, for example, an electromagnetic valve, which is normally open and configured to close as needed. The filter 12 is configured to filter air, which flows through the atmospheric pipe 10 into the canister 3.

Subsequently, a configuration of the solenoid valve 1 will be described with reference to FIG. 1. The solenoid valve 1 includes an inlet pipe 14, an outlet pipe 16, a valve element 17, a solenoid portion SL, and/or the like. The inlet pipe 14 forms an inflow port 13. The outlet pipe 16 forms an outflow port 15. The valve element 17 is configured to open and close a passage between the inflow port 13 and the outflow port 15. The solenoid portion SL manipulates the valve element 17. The inlet pipe 14 is, for example, molded of resin integrally with a solenoid case 18. The solenoid case 18 forms an enclosure of the solenoid portion SL. The solenoid case 18 may be one example of a stationary component. The inflow port 13 of the inlet pipe 14 is formed to be perpendicular to an operational direction of the solenoid portion SL. The operational direction of the solenoid portion SL is along a horizontal direction in FIG. 1. The inflow port 13 is connected with a pipe 5a (FIG. 6) on the side of the fuel tank 2.

The outlet pipe 16 is molded of resin as a separate component from the inlet pipe 14. The outlet pipe 16 is connected airtightly with the solenoid case 18 and the inlet pipe 14. The outflow port 15 of the outlet pipe 16 is formed to extend along the operational direction of the solenoid portion SL. The outflow port 15 is connected with a pipe 5b (FIG. 6) on the side of the canister 3. A communication chamber 19 is formed between the inlet pipe 14 and the outlet pipe 16. The communication chamber 19 communicates the inflow port 13 with the outflow port 15. The outlet pipe 16 is formed to have a flat surface around the outflow port 15, which is opened to the communication chamber 19. The flat surface of the outlet pipe 16 functions as a valve seat to which the valve element 17 is configured to be seated. The valve element 17 is formed of an elastic material, such as fluorocarbon rubber and/or silicon rubber. The valve element 17 is fitted to an outer circumferential periphery of a movable body 20. The valve element 17 is opposed to the valve seat and movable integrally with the movable body 20 in an axial direction. Specifically, the valve element 17 is movable leftward in FIG. 1.

The solenoid portion SL includes a coil 21, a stator 22, the movable body 20, a return spring 23, a regulating member 24, a stopper 25, and/or the like. The coil 21 functions as an electromagnet when supplied with electricity. The stator 22 is configured to be magnetized by the electromagnet. The movable body 20 is attracted by the magnetized stator 22 to move in the axial direction leftward in FIG. 1. The return spring 23 pushes back the movable body 20 when the coil 21 functioning as the electromagnet is de-activated. The regulating member 24 is opposed to the movable body 20 in the movable direction. The stopper 25 is fixed to the regulating member 24. The coil 21 is wound around a bobbin 26. The bobbin 26 is formed of a resin material, which is electrically insulative. The coil 21 has a coil end, which is pulled out of the bobbin 26 and is connected to a terminal 27. The terminal 27 is fixed to a connector portion 28. The connector portion 28 is formed of resin integrally with the solenoid case 18. The connector portion 28 is, for example, supplied with an exciting current according to an operation of an engine control unit (ECU). The ECU is equipped in a vehicle.

The stator 22 includes a cylinder core portion 22a and a plate core portion 22b. The cylinder core portion 22a is located on the radially inside of the coil 21. The plate core portion 22b is located on the right side of the coil 21 in FIG. 1. The cylinder core portion 22a has an outer periphery partially defining a magnetism saturated portion 22c. The magnetism saturated portion 22c is a recess at which a magnetic path becomes small in cross-section. The cylinder core portion 22a has an inner circumferential periphery defining a first step 22d. The first step 22d is located on the left side relative to the magnetism saturated portion 22c in FIG. 1. In FIG. 1, an inner diameter of a portion of the cylinder core portion 22a on the left side of the first step 22d is smaller than an inner diameter of a portion of the cylinder core portion 22a on the right side of the first step 22d. In FIG. 1, a second step 22e is formed on the left side of the first step 22d. In FIG. 1, an inner diameter of a portion of the cylinder core portion 22a on the left side of the second step 22e is smaller than an inner diameter of a portion of the cylinder core portion 22a on the right side of the second step 22e. In FIG. 1, an inner circumferential periphery of the portion of the cylinder core portion 22a on the right side of the first step 22d defines a first guide hole, and an inner circumferential periphery of the portion of the cylinder core portion 22a between the second step 22e and the first step 22d defines a second guide hole.

Figure 1:
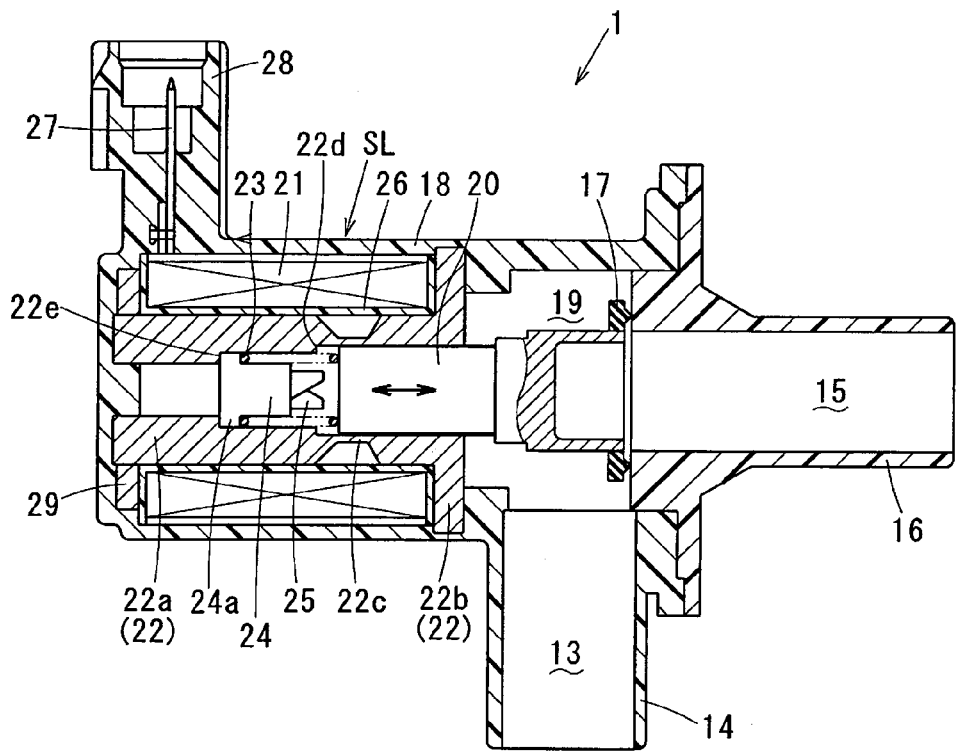
FIG. 1 is a sectional view showing a solenoid valve according to a first embodiment.

The plate core portion 22b is in a flange shape extending radially outward from an end of the cylinder core portion 22a on the right side in FIG. 1. A magnetic plate 29 is formed as a separate component from the stator 22. The magnetic plate 29 is located on the left side of the coil 21 in FIG. 1. That is, the magnetic plate 29 is located on the opposite side of the coil 21 from the plate core portion 22b in an axial direction. The magnetic plate 29 and the stator 22 form a part of a magnetic circuit.

Figure 2:
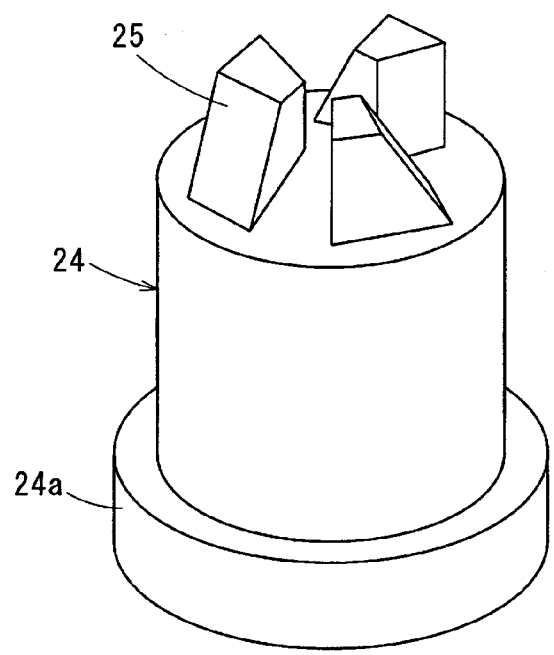
FIG. 2 is a perspective view showing a regulating member fixed with a stopper equipped in the solenoid valve according to the first embodiment.

The movable body 20 is inserted radially inside of the first guide hole. The movable body 20 is slidable in the axial direction along the inner circumferential periphery of the first guide hole. The movable body 20 is projected from the first guide hole into the communication chamber 19. The valve element 17 is fitted to an outer circumferential periphery of an end of the movable body 20 on the right side in FIG. 1. When the electromagnet is de-activated, the valve element 17 is seated on the valve seat to block the inflow port 13 from the outflow port 15. As shown in FIG. 2, the regulating member 24 is formed of, for example, resin and is in a column shape. A flange 24a is equipped to one end of the regulating member 24 in the axial direction. Referring to FIG. 1, the regulating member 24 is inserted radially inside of the second guide hole. An end surface of the flange 24a is in contact with the second step 22e to regulate movement of the regulating member 24 in the axial direction leftward in FIG. 1. The return spring 23 applies biasing force onto the flange 24a thereby to urge the flange 24a onto the second step 22e. Thus, the return spring 23 causes a frictional force between the flange 24a and the second step 22e. In this way, the return spring 23 regulates rotation of the regulating member 24 relative to the stator 22. The return spring 23 is inserted radially inside of the second guide hole and located radially outside of a part of the regulating member 24. The return spring 23 is supported by the flange 24a of the regulating member 24 at one end. The return spring 23 is in contact with an end surface of the movable body 20 at the other end. The return spring 23 biases the movable body 20 in a closing direction toward the right side in FIG. 1.

Figure 3:
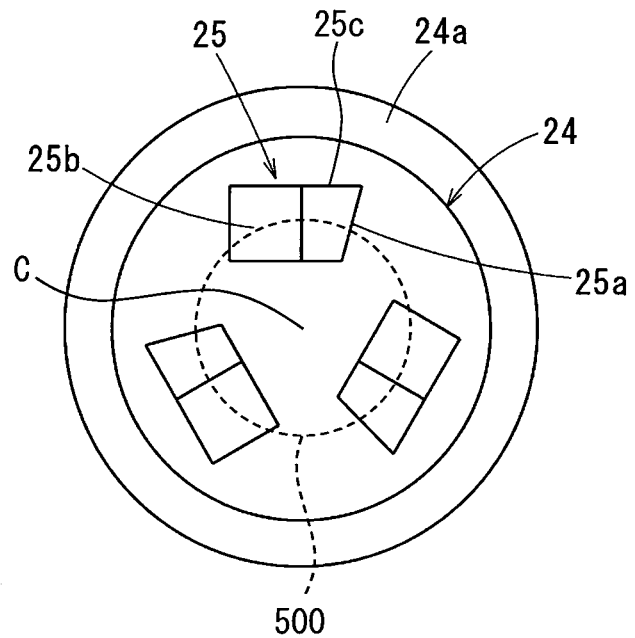
FIG. 3 is a plan view showing the regulating member fixed with the stopper according to the first embodiment.
Figure 4:
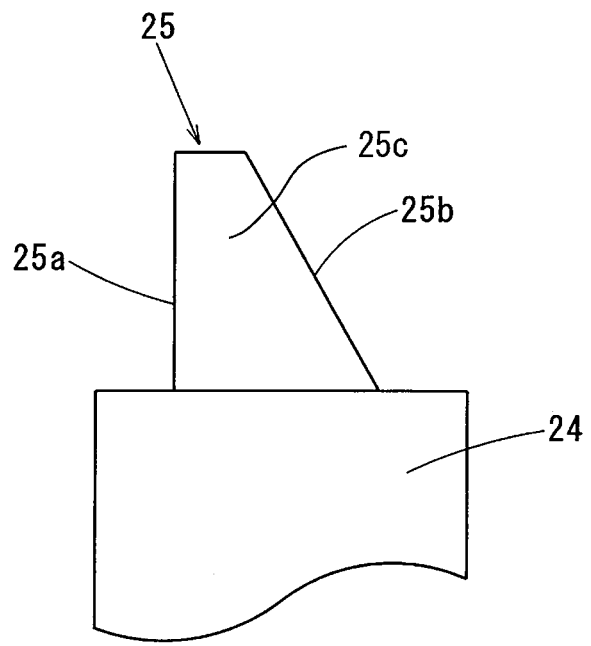
FIG. 4 is a side view showing the stopper according to the first embodiment.

Subsequently, a configuration of stoppers 25 will be described. Each of the stoppers 25 functions as an elastic member in the present disclosure. As shown in FIG. 2, each stopper 25 is formed of, for example, rubber. The regulating member 24 has an end surface on the opposite side of the flange 24a, and the end surface of the regulating member 24 is equipped with three stoppers 25. More specifically, the stoppers 25 are fixed to the regulating member 24 by baking, by adhesion, by fitting, and/or the like. More specifically, the stoppers 25 may be fixed to the regulating member 24 by fitting in a following configuration. For example, recessed portions may be formed in an end surface of the regulating member 24, and a projected portion may be formed on a bottom surface of each stopper 25 correspondingly. The projected portion of the stopper 25 may be fitted to corresponding one of the recessed portions of the regulating member. In this way, the stoppers 25 are fitted to the regulating member 24. As shown in FIG. 3, the three stoppers 25 are located along a circumferential direction of the regulating member 24 at regular angular intervals. Thus, the three stoppers 25 are rotational symmetric to each other. Each stopper 25 is in an asymmetrical shape relative to an axial rotational direction. As follows, explanation will be made about the stopper 25 being in the asymmetrical shape relative to the axial rotational direction. As shown in FIG. 4, the stopper 25 is in a right-left asymmetrical shape when the stopper 25 is viewed from the radially outside of the regulating member 24 toward a center C of the regulating member 24. That is, in FIG. 4, the stopper 25 is in the right-left asymmetrical shape when the stopper 25 is viewed along a normal line of an outer circumferential periphery 25c of the stopper 25.

In FIG. 3, a concentric circle 500 is concentric relative to the center C of the regulating member 24. The concentric circle 500 passes a point shifted from the center C in the radial direction. The axial rotational direction is, for example, along the concentric circle 500.

Each of the three stoppers 25 is in the asymmetrical shape in the same direction relative to the along-axis rotational direction. All the three stoppers 25 are in the same shape when being viewed along the normal line. In the example shown in FIG. 4, a lateral side 25a of the stopper 25 on the left side is raised straight perpendicularly to the end surface of the regulating member 24. To the contrary, in FIG. 4, a lateral side 25b of the stopper 25 on the right side is inclined relative to the end surface of the regulating member 24. The stopper 25 has a height, which is slightly greater than a distance in the axial direction from an end surface of the regulating member 24, to which the stopper 25 is equipped, to the first step 22d of the cylinder core portion 22a. That is, the size of the stopper 25 in the axial direction is slightly greater than the distance between the end surface of the regulating member 24 to the first step 22d. In the present configuration, the stopper 25 has a tip end surface opposed to the movable body 20 in the axial direction. The tip end surface of the stopper 25 is projected slightly beyond a position of the first step 22d toward the movable body 20 in the axial direction. That is, the tip end surface of the stopper 25 is projected slightly beyond the first step 22d in the axial direction rightward in FIG. 1. Specifically, the height of the stopper's 25 is determined, such that the end surface of the movable body 20 does not make contact with the first step 22d, when the movable body 20 is attracted by the stator 22 to collide against the stopper 25 and to deform the stopper 25 elastically.

Subsequently, an operation of the solenoid valve 1 will be described.

a) When the Solenoid Valve 1 is Not in Operation

When electricity is not supplied to the coil 21 of the solenoid portion SL, the electromagnet is de-activated. That is, the solenoid valve 1 is not in operation. In the present de-activated state, the movable body 20 is biased in the closing direction on application of the resilient force from the return spring 23. Therefore, the valve element 17, which is mounted on the movable body 20, is seated on the valve seat, which is formed around the circumference of the outflow port 15. That is, as shown in FIG. 1, the solenoid valve 1 is in a closed state. In the present closed state, the inflow port 13 is blocked from the outflow port 15.

b) When the Solenoid Valve 1 is in Operation

When electricity is supplied to the coil 21 of the solenoid portion SL, the electromagnet is activated. That is, the solenoid valve 1 is in operation. In the present activated state, the stator 22 is magnetized by the electromagnet, and the movable body 20 is attracted by the magnetized stator 22. Therefore, the movable body 20 moves in the opening direction against the biasing force of the return spring 23. The valve element 17 is lifted from the valve seat in this way. Thus, the solenoid valve 1 is in an opened state, and the inflow port 13 is communicated with the outflow port 15. The movable body 20 moves in the opening direction and collides against the three stoppers 25, which are fixed to the end surface of the regulating member 24. Thus, the movable body 20 stops moving.

Operation and Effect of First Embodiment

Figure 5A:
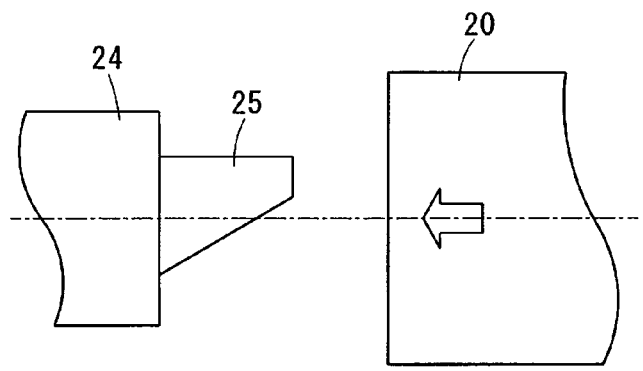
FIGS. 5A to 5C are views showing the movable body colliding against the stopper according to the first embodiment.
Figure 5B:
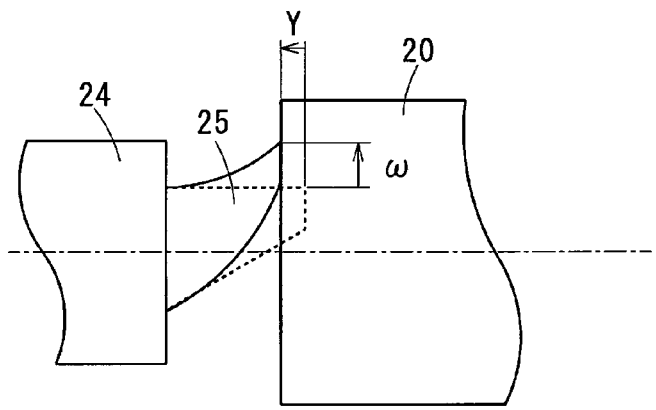

The solenoid valve 1 according to the first embodiment includes the regulating member 24. When the movable body 20 is attracted by the stator 22 and moved in the opening direction, the regulating member 24 regulates movement of the movable body 20. The regulating member 24 is equipped with the stoppers 25. The stoppers 25 are formed of an elastic material such as rubber. When the movable body 20 collides against the stopper 25, the stopper 25 is elastically deformed to absorb kinetic energy of the movable body 20. That is, the stopper 25 absorbs collision energy when the movable body 20 collides against the stopper 25. As shown in FIG. 4, the stopper 25 is in the asymmetrical shape relative to the axial rotational direction of the regulating member 24. In other words, rigidity of the stopper 25 is asymmetrical relative to the axial rotational direction. Therefore, as shown in FIG. 5A, when the movable body 20 moves toward the stopper 25 on electricity supply, and when the movable body 20 collides against the stopper 25 as shown in FIG. 5B, the stopper 25 elastically deforms in both the axial direction and the circumferential direction.

Figure 5C:
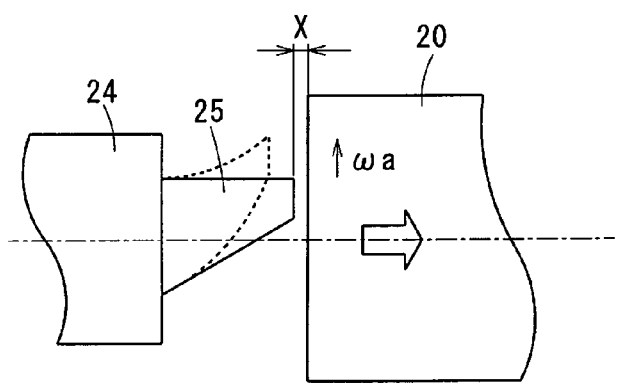
Figure 16A:
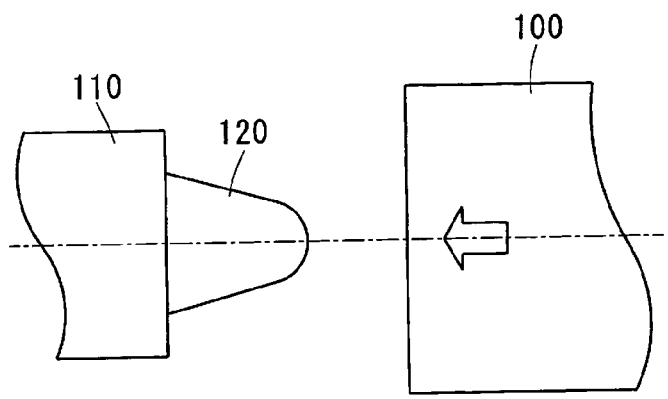
FIGS. 16A to 16C are views showing a movable body colliding against a projection according to a prior art.
Figure 16B:
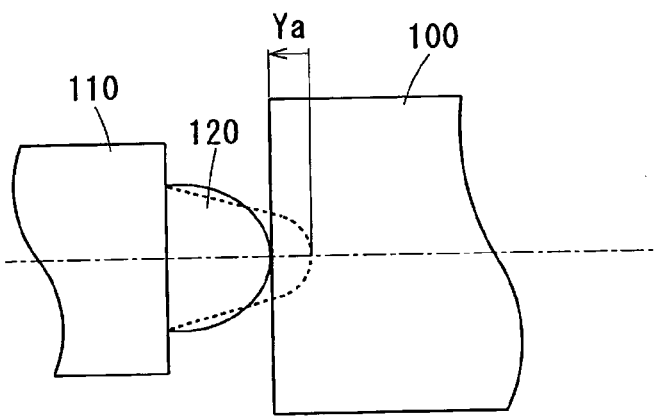
Figure 16C:
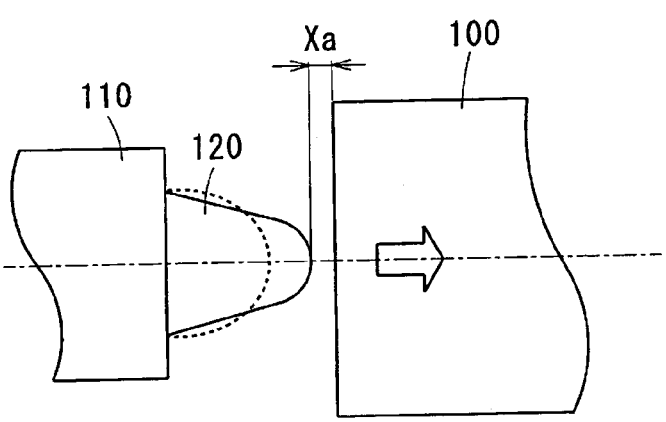

With the present configuration, the movable body 20 collides against the stopper 25 to deform the stopper 25 in the circumferential direction. Consequently, the movable body 20 rotates in the rotational direction at a predetermined speed ω. Therefore, collision energy caused when the movable body 20 collides against the stopper 25 is converted into kinetic energy at a speed ω in the rotational direction, additionally to deformation Y of the stopper 25 in the axial direction. In this way, the collision energy is dispersed. Consequently, the present configuration enables to reduce collision sound caused when the movable body 20 collides against the stopper 25. In addition, after the movable body 20 collides against the stopper 25 to deform the stopper 25, as shown in FIG. 5C, the movable body 20 bounces from the stopper 25 on application of resilience of the stopper 25. It is noted that, nothing disturbs rotary motion of the movable body 20 in the rotational direction of the movable body 20. Therefore, the movable body 20 continually rotates at a speed ωa until the movable body 20 is seated on the end surface of the stopper 25. As described above, the collision energy of the movable body 20 is distributed additionally in the rotational direction. Therefore, an amount X, by which the movable body 20 bounces on the stopper 25, becomes smaller than an amount Xa shown in FIG. 16C, by which a movable body bounces in the exemplified configuration. Thus, the present configuration enables to restrain fluctuation in flow.

In addition, the movable body 20 rotates when colliding against the stopper 25. In this way, the outer periphery of the movable body 20, which slides on the inner circumferential periphery of the first guide hole of the cylinder core portion 22a, is rotated regularly and is varied in its relative position to the cylinder core portion 22a. Therefore, the present configuration enables to uniformize abrasion of the outer periphery of the movable body 20 caused by sliding on the cylinder core portion 22a. Thus, the present configuration enables to enhance lifetime of the movable body 20. Furthermore, according to the first embodiment, the three stoppers 25 are equipped to the regulating member 24. Specifically, the three stoppers 25 are rotational symmetric to each other. Therefore, when the movable body 20 collides against the stopper 25, the present configuration restricts the movable body 20 from inclining. Thus, the present configuration enables to rotate the movable body 20 steadily.

As follows, other embodiments according to the disclosure will be described.

Second Embodiment

Figure 7:
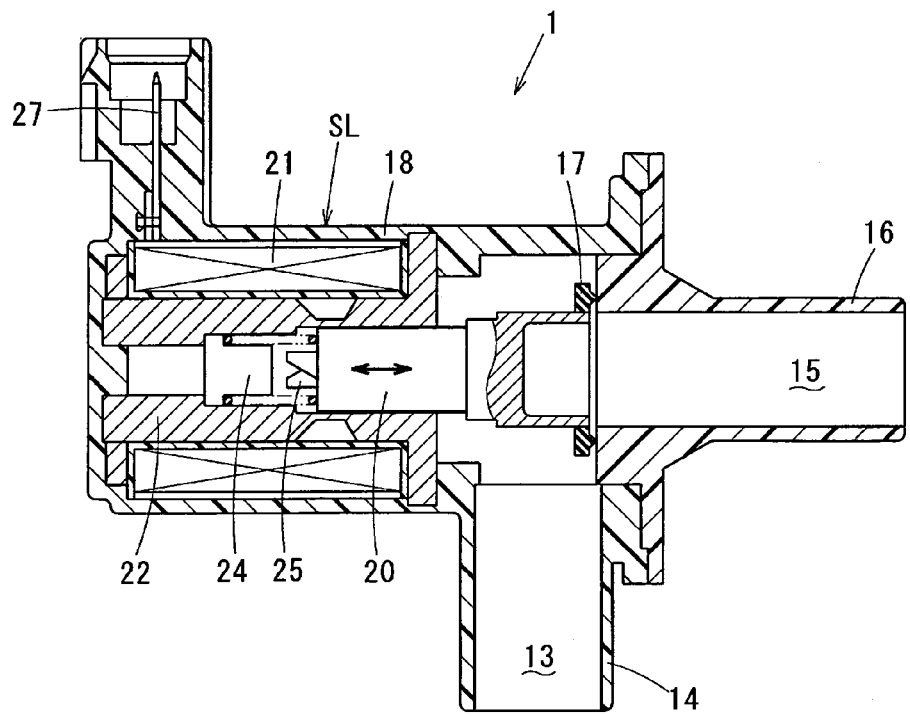
FIG. 7 is a sectional view showing a solenoid valve according to a second embodiment.

As shown in FIG. 7, according to the present second embodiment, the stoppers 25 are fixed to the movable body 20. The configuration of the second embodiment is equivalent to the configuration of the first embodiment, except for the stoppers 25 fixed to the movable body 20. According to the present structure, the second embodiment enables to produce an operation effect equivalent to the operation effect produced by the configuration of the first embodiment.

Third Embodiment

Figure 8:
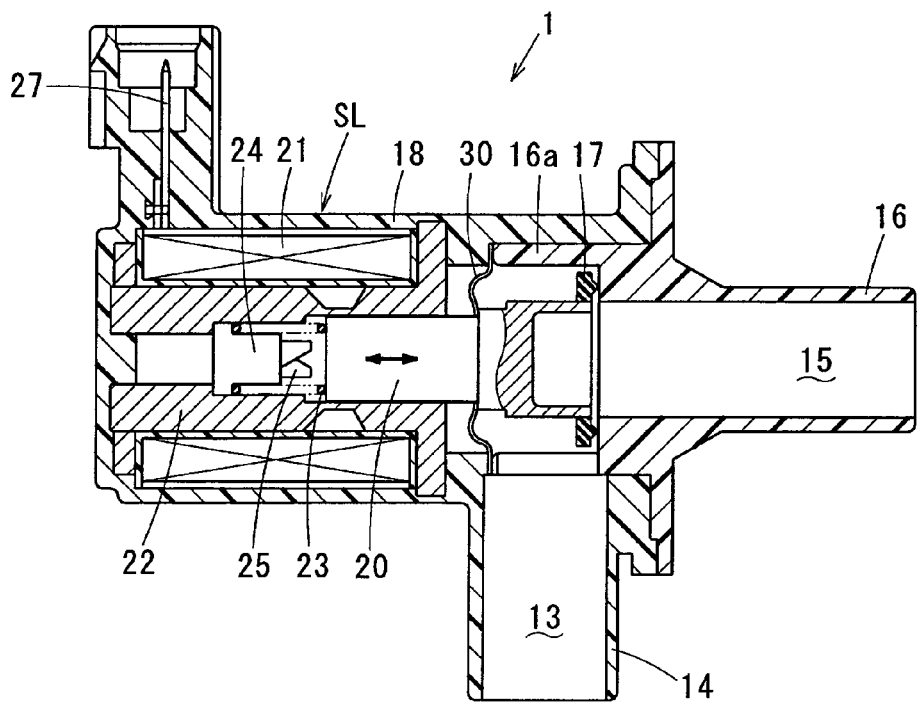
FIG. 8 is a sectional view showing a solenoid valve according to a third embodiment.

As shown in FIG. 8, according to the third embodiment, a diaphragm 30 is equipped to the radially outside of the movable body 20. Bellows may be equipped instead of or in addition to the diaphragm 30. The diaphragm (or bellows) 30 is interposed at its outer circumferential end between a step portion of the solenoid case 18 and a tubular portion 16a of the outlet pipe 16. Thus, the diaphragm 30 is fixed at its radially outer end between the solenoid case 18 and the outlet pipe 16. In the first and second embodiments, illustration of the tubular portion 16a is omitted in the outlet pipe 16. It is noted that, similarly to the present third embodiment, the tubular portion 16a may be formed in the outlet pipe 16 in the configurations of the first and second embodiments. In this way, commonality of components can also be attained among the configurations of the embodiments. The diaphragm 30 is formed of an elastic material, such as rubber, and is flexible and bendable in its circumferential direction. The diaphragm 30 enables the movable body 20 to move in the axial direction. In addition, the diaphragm 30 enables the movable body 20 to rotate when the movable body 20 collides against the stopper 25.

According to the present configuration, when the electromagnet is deactivated and when the movable body 20 is pushed back in the closing direction on application of resilience of the return spring 23, the diaphragm 30 applies its resilience on the movable body 20. Therefore, the valve element 17 equipped to the movable body 20 is enabled to be seated regularly at a constant position relative to the valve seat. That is, the present configuration enables to stabilize the seated position of the valve element 17. Therefore, the present configuration enables to prevent or reduce leakage when the valve element 17 is seated. It is noted that, in the present embodiment, the stopper 25 is bent in the circumferential direction when the movable body 20 collides against the stopper 25, similarly to the first embodiment. In the present embodiment, the stopper 25 applies a rotational force on the movable body 20 thereby to distribute collision energy in the rotational direction and to reduce a collision sound. Thus, the configuration of the present embodiment also produces an effect to reduce bounce of the movable body 20 similarly to the first embodiment.

Fourth Embodiment

Figure 9:
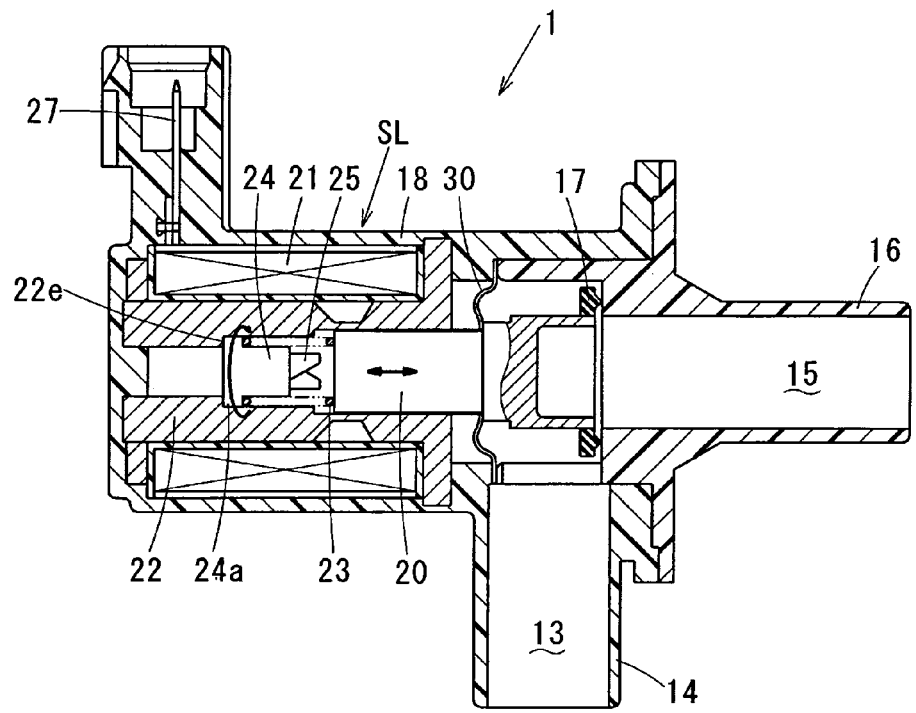
FIG. 9 is a sectional view showing a solenoid valve according to a fourth embodiment.
Figure 10:
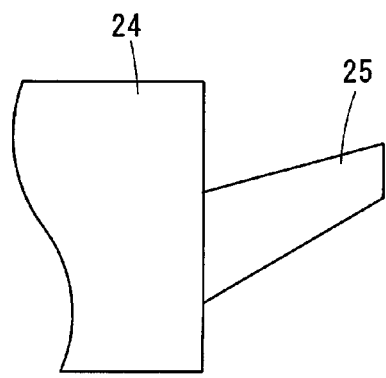
FIGS. 10 to 15 are side views showing examples of stoppers, respectively, according to a fifth embodiment.
Figure 11:
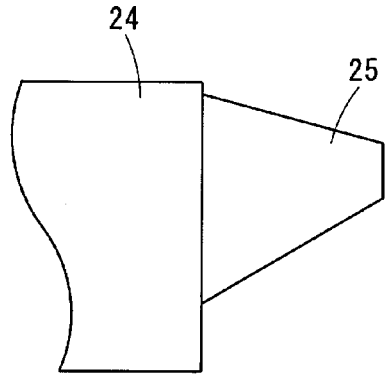
Figure 12:
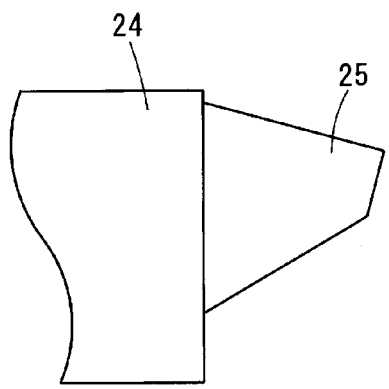

As indicated by an arrow in FIG. 9, in the present fourth embodiment, the regulating member 24 is rotatable relative to the stator 22, additionally to the configuration of the third embodiment. Specifically, surface roughness of both the flange 24a of the regulating member 24 and the second step 22e, which is formed in the cylinder core portion 22a, is set small, such that the regulating member 24 is enabled to rotate relative to the stator 22 against application of resilience of the return spring 23. That is, the contact surfaces of the flange 24a and the second step 22e, on which frictional force acts, is formed further smoothly. Alternatively or in addition, a coating material may be applied on the contact surfaces of the flange 24a of the regulating member 24 and the second step 22e to reduce a frictional force working on the contact surfaces.

In the present configuration, when the movable body 20 collides against the stopper 25, the regulating member 24 is enabled to rotate relative to the stator 22. In addition, the deformation of the stopper 25 in the circumferential direction enables the movable body 20 to rotate in the circumferential direction. Therefore, even when the diaphragm 30 (or bellows) deforms in the rotational direction by a small amount, kinetic energy (collision energy) caused when the movable body 20 collides against the stopper 25 can be converted into rotational energy of the regulating member 24. Thus, the present configuration also produces an effect similarly to the third embodiment. The solenoid valve 1 shown in FIG. 9 includes the diaphragm 30, via which the movable body 20 is fixed to the solenoid case 18. It is noted that, the regulating member 24 may be enabled to rotate relative to the stator 22 in the configurations of the first embodiment and the second embodiment, in which the diaphragm 30 is not equipped.

Fifth Embodiment

Figure 13:
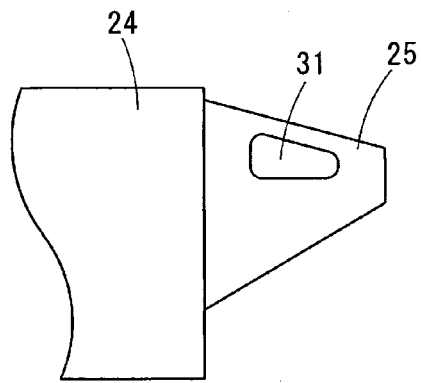

The present fifth embodiment relates to an elastic member (stopper 25) according to anther embodiment of the present disclosure. As described in the first embodiment, the stopper 25 is in the asymmetrical shape relative to the axial rotational direction of the regulating member 24. In the second embodiment, the stopper 25 is in the asymmetrical shape relative to the axial rotational direction of the movable body 20. In other words, in the configurations of the first embodiment and the second embodiment, rigidity of the stopper 25 is asymmetrical relative to the axial rotational direction. In consideration of the above-described configurations, the stopper 25 may be, for example, in one of shapes shown in FIG. 10 to FIG. 13, respectively, alternatively to the configurations shown in FIGS. 2 to 4 of the first embodiment. It is noted that, the stopper 25 shown in FIG. 13 may have an outer circumferential periphery substantially in a symmetrical shape relative to the axial rotational direction. It is further noted that, the stopper 25 in FIG. 13 has a hollow portion 31 at a position on the left side relative to a center of the stopper 25 in the axial rotational direction. In this way, the stopper 25 may have an asymmetrical shape relative to the axial rotational direction. That is, the present configuration renders a rigidity of the stopper 25 asymmetrical relative to the axial rotational direction.

Figure 14:
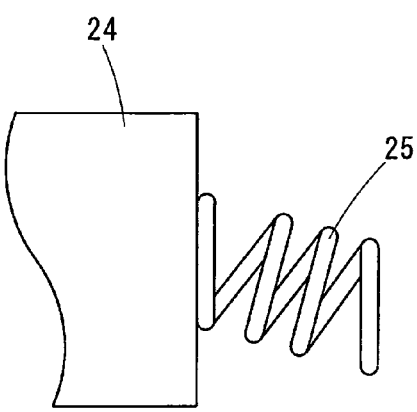
Figure 15:
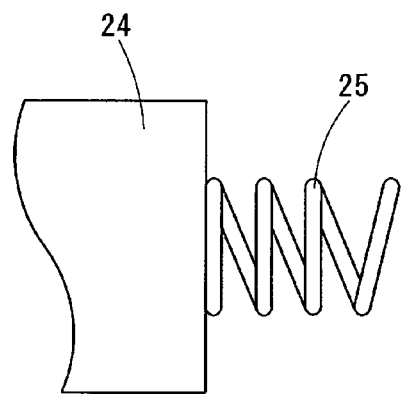

In the first embodiment, the stopper 25 is formed of rubber. It is noted that, the material of the stopper 25 is not limited to rubber. The stopper 25 may be formed of a rubber-like elastic material such as an elastomer. It is further noted that, the stopper 25 is not limited to be formed of rubber and/or elastomer. As shown in FIGS. 14 and 15, the stopper 25 may be, for example, a coil spring. In this case, the coil spring may be formed of a metallic material and may be formed of resin.

Variation

In the first embodiment, the configuration including the three stoppers 25 is employed. It is noted that, the number of the stoppers 25 is not limited to three. For example, at least one stopper 25 may be equipped to the regulating member 24 at a position shifted in the radial direction, i.e., shifted from the center position. For example, at least one stopper 25 may be equipped to the movable body 20 at a position shifted in the radial direction, i.e., shifted from the center position in the second embodiment.

In the regulating member 24 according to the first embodiment, the flange 24a receives resilience of the return spring 23 to be biased onto the second step 22e. Thus, frictional force is caused to regulate rotation of the flange 24a relative to the stator 22. It is noted that, the regulating member 24 may be fixed relative to the stator 22 by employing another configuration. For example, the outer circumferential periphery of the flange 24a may be fitted to the inner circumferential periphery of the second guide hole via a combination of a spline slot and a spline tooth and/or a combination of a serration slot and a serration tooth. In this way, rotation of the flange 24a may be regulated relative to the stator 22. Alternatively or in addition, the outer circumferential periphery of the flange 24a may be press-fitted into the inner circumferential periphery of the second guide hole. In this way, rotation of the stator 22 may be regulated.

According to the first embodiment, the solenoid valve 1 employing the present configuration according to the present disclosure is used in the vapor fuel processing system. Alternatively or in addition, the present configuration employed in the solenoid valve 1 may be applied to the purge control valve 8 and/or the canister control valve 11 used in the system. The present configuration may be applied to another valve device, such as a valve for controlling oil in an automatic transmission (AT) device, a valve for controlling oil in an engine valve timing variable device, and/or a solenoid valve for a fuel injector of an engine, other than a vapor fuel processing system.

The configuration of the solenoid valve 1 according to the present disclosure may be variously applicable to other devices, which require to suppress, for example, collision sound occurring when the movable body 20 collides against the stopper 25 and/or fluctuation in flow caused by bounce of the movable body 20.

According to the present disclosure, the solenoid valve includes the coil, the stator, the movable body, the valve element, the regulating member, the elastic member, and the solenoid valve. The coil is configured to form an electromagnet in response to electricity supply. The stator is located inside an inner periphery of the coil and is configured to be magnetized by the electromagnet. The movable body is configured to be attracted by the stator, which is magnetized when the electromagnet is activated. The valve element is movable integrally with the movable body in the axial direction. The regulating member is opposed to the movable body in the movable direction of the movable body, which is movable when attracted by the stator. The regulating member regulates movement of the movable body. The elastic member is equipped to one of the regulating member and movable body. The elastic member is deformable elastically thereby to absorb a kinetic energy of the movable body, when the movable body is attracted by the stator to move to urge the elastic member between the movable body and the regulating member. The solenoid valve is configured to activate and de-activate the electromagnet to drive the valve element integrally with the movable body in the axial direction thereby to open and close the fluid passage. The elastic member is shifted in position in the radial direction and is in an asymmetrical shape relative to the axial rotational direction relative to the regulating member or the movable body.

In the above-described configuration, the elastic member is equipped to, for example, the regulating member. In this case, when the movable body is attracted by the stator, which is magnetized with the electromagnet, to move to collide against the elastic member, the elastic member is compressed in the axial direction. In addition, the elastic member is deformed elastically also in the circumferential direction. The deformation of the elastic member in the circumferential direction causes the movable body, which collides against the elastic member, to rotate in the circumferential direction at a predetermined speed. In the present configuration, the movable body collides against the elastic member. Thus, kinetic energy of the movable body, which is attracted by the stator to move, is dispersed into the axial direction and the rotational direction. Specifically, the kinetic energy is divided into the axial direction and the rotational direction by deformation of the elastic member in the circumferential direction, in addition to deformation of the elastic member in the axial direction. Consequently, collision sound, which is caused when the movable body collides against the elastic member, is reduced. In addition, bounce of the movable body is reduced. In this way, fluctuation in flow is restrained. The effects are exemplified with the configuration in which the elastic member is equipped to the regulating member. It is noted that, equivalent effects can be produced in a configuration in which the elastic member is equipped to the movable body.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A solenoid valve comprising:
   a coil configured to form an electromagnet when supplied with electricity and activated;
   a stator located radially inside the coil and configured to be magnetized with the electromagnet;
   a movable body configured to be attracted by the stator when the stator is magnetized with the electromagnet, which is activated;
   a valve element movable integrally with the movable body in an axial direction;
   a regulating member opposed to the movable body in a movable direction, in which the movable body is attracted by the stator to move, and configured to regulate movement of the movable body; and
   at least one elastic member equipped to one of the regulating member and the movable body, the at least one elastic member configured to be urged between the movable body and the regulating member and to deform elastically to absorb a kinetic energy of the movable body when the movable body is attracted by the stator to move toward the stator, wherein
   the electromagnet is configured to move the valve element integrally with the movable body in the axial direction to open and close a fluid passage when activated and de-activated,
   the at least one elastic member is located at a position shifted in a radial direction relative to the one of the regulating member and the movable body, and
   the at least one elastic member is in an asymmetrical shape relative to an axial rotational direction.

2. The solenoid valve according to claim 1, wherein
   the at least one elastic member includes a plurality of elastic members, and
   the elastic members are rotationally symmetric to each other relative to the one of the regulating member and the movable body.

3. The solenoid valve according to claim 1, wherein the at least one elastic member is configured to be deformed elastically in both the axial direction and a circumferential direction when the movable body moves to urge the elastic member with the regulating member.

4. The solenoid valve according to claim 1, further comprising:
   a stationary component located radially outside the movable body; and
   one of a diaphragm and bellows elastically deformable in both the axial direction and a circumferential direction, wherein
   the movable body is connected with the stationary component via the one of the diaphragm and the bellows.

5. The solenoid valve according to claim 1, wherein
   the stator is in a tubular shape,
   the regulating member is located radially inside the stator, and
   the regulating member is rotatable.

* * * * *